United States Patent Office 3,556,719
Patented Jan. 19, 1971

3,556,719
PROCESS OF PREPARING HYDROXYL-
AMMONIUM SULFATE
Wallace F. Runge and Herbert L. Wehrmeister, Terre
Haute, Ind., assignors to Commercial Solvents Corporation, New York, N.Y., a corporation of Maryland
No Drawing. Continuation of application Ser. No.
440,937, Mar. 18, 1965. This application Mar. 20,
1969, Ser. No. 809,488
Int. Cl. C01c 1/24
U.S. Cl. 23—117                                    6 Claims

ABSTRACT OF THE DISCLOSURE

A process for preparing hydroxylammonium sulfate comprising adding to an aqueous solution of hydroxylammonium acid sulfate an alcohol selected from the group consisting of 1-propanol, 2-propanol, 2-methyl-1-propanol, 1-butanol and 2-butanol.

---

This application is a continuation of application Ser. No. 440,937, filed Mar. 18, 1965, and now abandoned.

This invention relates to a process for the production of hydroxylammonium sulfate. In a particular aspect it relates to a process for the production of hydroxylammonium sulfate from hydroxylammonium acid sulfate and an alcohol selected from the group consisting of 1-propanol, 2-propanol, 2-methyl-1-propanol, 2-butanol and 1-butanol. In a further aspect the invention relates to a process for producing hydroxylammonium sulfate by the addition of an alcohol selected from the group consisting of 1-propanol, 2-propanol, 2-methyl-1-propanol, 1-butanol and 2-butanol to hydroxylammonium acid sulfate.

The production of hydroxylammonium sulfate by the addition of hydroxylammonium acid sulfate, as molten hydroxylammonium acid sulfate or as aqueous hydroxylammonium acid sulfate, to methanol is well known.

It is an object of the present invention to provide a process for the production of hydroxylammonium sulfate.

It is a further object of the present invention to provide a process for the production of hydroxylammonium sulfate of relatively large crystalline size.

Further objects and advantages of the invention will be apparent from the specification and appended claims.

The present invention in a first embodiment constitutes an improvement over the prior art as represented by the above referred to methanol and hydroxylammonium acid sulfate process and resides in the discovery that increased yields of hydroxylammonium sulfate are obtained by mixing hydroxylammonium acid sulfate and an alcohol selected from the group consisting of 1-propanol, 2-propanol, 2-methyl-1-propanol, 1-butanol and 2-butanol hereinafter referred to as the multicarbon alcohols.

The present invention in a second and preferred embodiment constitutes an improvement over the prior art as represented by the above referred to methanol and hydroxylammonium acid sulfate process and resides in the discovery that relatively large size crystals of hydroxylammonium sulfate are produced when the mixing is accomplished by adding the multicarbon alcohol to the hydroxylammonium acid sulfate. The larger crystals of hydroxylammonium sulfate are preferred to the smaller crystals because they are more free flowing and have a lesser tendency to dust and cake during storage.

In accordance with the present invention the multicarbon alcohol or an aqueous solution thereof is mixed with the hydroxylammonium acid sulfate. The mixing may be accomplished by any suitable method. For example either a batch procedure or a continuous procedure involving the mixing of separate streams of hydroxylammonium acid sulfate and multicarbon alcohol may be utilized. The hydroxylammonium acid sulfate may be anhydrous or an aqueous solution. In the preferred embodiment of the invention the mixing is accomplished by adding the multicarbon alcohol to the hydroxylammonium acid sulfate. The mixing of hydroxylammonium acid sulfate and multicarbon alcohol is conveniently carried out under atmospheric pressure and at temperatures of from about 40 to about 90° C. The precipitation of the hydroxylammonium sulfate is then facilitated by cooling the resulting system. Temperatures in the range of 10 to 25° C. are typically employed. The precipitated hydroxylammonium sulfate may then be recovered from the system by any suitable means. As one example, the system is filtered and the solid product is washed with methanol and then dried under vacuum for several hours at 50-60° C. The multicarbon alcohol may be readily recovered from the filtrate by distillation and then may be reused.

In practicing the invention it is permissible to substitute water for a portion of the multicarbon alcohol. This may be accomplished by using an aqueous solution of multicarbon alcohol or by using an aqueous solution of hydroxylammonium acid sulfate. However, in order to obtain the desired results of increased yields in the present process it has been found that attention should be given to the volume ratio of multicarbon alcohol to water in the system. Generally the volume ratio of multicarbon alcohol to water should be in excess of 70:30. For optimum results it is preferred that the volume ratio of multicarbon alcohol to water should be in excess of 80:20.

In following the process of the invention attention should also be given to the total volumes of multicarbon alcohol and water. It has been found that the desired yields of hydroxylammonium sulfate are most readily obtained when from about 0.8 to about 2.0 grams of hydroxylammonium acid sulfate are used per cubic centimeter of the total of multicarbon alcohol and water. Optimum results are obtained when from about 1.0 to about 1.5 grams of hydroxylammonium acid sulfate are utilized per cc. of the total of multicarbon alcohol and water.

The hydroxylammonium acid sulfate utilized in the present invention is commercially available and may be obtained by any suitable means. One such means for obtaining hydroxylammonium acid sulfate comprises reacting a primary nitroparaffin with approximately an equimolecular quantity of sulfuric acid in the presence of at least one mole of water per mole of nitroparaffin.

The invention will be understood more fully by reference to the following specific examples. It is understood that the examples are presented for purposes of illustration only and are not intended as a limitation of the invention.

EXAMPLE 1

This example is offered to illustrate the production of hydroxylammonium sulfate by the addition of 2-propanol to hydroxylammonium acid sulfate.

An aqueous solution of hydroxylammonium acid sulfate was prepared by mixing 402.6 grams of molten hydroxylammonium acid sulfate with 25 cc. of water in an open vessel. To this solution were then slowly added 400 cc. of 88% aqueous 2-propanol. The addition was accomplished over a 2-hour period during which time the temperature of the system was maintained in the range of about 55 to about 65° C. Crystalline hydroxylammonium sulfate was formed. At the end of the 2-hour addition period the resulting material was cooled in an ice bath to approximately 10° C. to form additional crystalline hydroxylammonium sulfate. The cooled material was then filtered and the crystalline hydroxylammonium sulfate was washed with methanol. The washed material was then dried under vacuum at approximately 50° C. for 8 hours. Crystalline hydroxylammonium sulfate was obtained in a yield of 93% based on hydroxylammonium acid sulfate.

EXAMPLE 2

This example is offered to illustrate the production of hydroxylammonium sulfate by the addition of 1-butanol to hydroxylammonium acid sulfate.

An aqueous solution of hydroxylammonium acid sulfate was prepared by mixing 400 grams of hydroxylammonium acid sulfate and 55 grams of water in an open vessel. To this solution were then slowly added 495 grams of anhydrous 1-butanol. The addition was accomplished in a 2-hour period during which period the temperature of the system was maintained in the range of about 55 to about 65° C. Crystalline hydroxylammonium sulfate was formed. At the end of the 2-hour addition period the resulting mixture was cooled to about 18° C. in an ice bath to form additional crystalline hydroxylammonium sulfate. The cooled material was then filtered and the crystalline hydroxylammonium sulfate was washed with anhydrous methanol. The washed material was then dried under vacuum at approximately 50 to 60° C. for 8 hours. Crystalline hydroxylammonium sulfate was obtained in a yield of 92% based on hydroxylammonium acid sulfate.

EXAMPLE 3

This example is offered to illustrate the production of hydroxylammonium sulfate by addition of hydroxylammonium acid sulfate to methanol.

394.3 grams of molten hydroxylammonium acid sulfate were added to 400 cc. of 85% aqueous methanol. The addition was accomplished in a 1-hour period during which period the temperature of the system was maintained in the range of about 55 to about 65° C. Crystalline hydroxylammonium sulfate was formed. At the end of the 1-hour addition period the resulting material was cooled in an ice bath to approximately 10° C. to form additional crystalline hydroxylammonium sulfate. The cooled material was filtered and the crystalline hydroxylammonium sulfate was then washed with anhydrous methanol. The washed material was then dried under vacuum at approximately 50 to 60° C. for 8 hours. Crystalline hydroxylammonium sulfate was obtained in a yield of 83% based on the hydroxylammonium acid sulfate.

The crystalline size of the hydroxylammonium sulfate of Example 3 was observed to be smaller than the crystalline size of the hydroxylammonium sulfate of either Example 1 or Example 2.

The superior results obtained by practice of the present invention are further demonstrated by a comparison of the yield of hydroxylammonium sulfate shown in Example 3 in which methanol was used with yields of hydroxylammonium sulfate shown in Example 1 in which 2-propanol was used and in Example 2 in which 1-butanol was used.

EXAMPLE 4

The procedure of Example 2 is repeated in all essential details except that 1-butanol is replaced by 2-methyl-1-propanol. Crystalline hydroxylammonium sulfate is obtained.

EXAMPLE 5

The procedure of Example 2 is repeated in all essential details except that 1-butanol is replaced by 1-propanol. Crystalline hydroxylammonium sulfate is obtained.

Since many embodiments may be made of this invention and since many changes may be made in the embodiments described, the foregoing is to be interpreted as illustrative only and the invention is defined by the claims appended hereto.

We claim:
1. A process for obtaining crystalline hydroxylammonium sulfate from an aqueous solution of hydroxylammonium acid sulfate which comprises adding to said solution, while maintaining the system at about 40 to 90° C., an alcohol selected from the group consisting of 1-propanol, 2-propanol, 2-methyl-1-propanol, 1-butanol and 2-butanol, said alcohol being added in amounts such that the volume ratio of said alcohol to water in the system is in excess of 70:30 and the system contains about 0.8 to 2.0 grams of hydroxylammonium acid sulfate per each cubic centimeter of said alcohol and water combined, cooling the system to about 10 to 25° C. and recovering precipitated crystalline hydroxylammonium sulfate from the system.

2. The process of claim 1 wherein the alcohol is added in amounts such that the volume ratio of said alcohol to water in the system is in excess of 80:20 and the system contains about 1.0 to 1.5 grams of hydroxylammonium acid sulfate per each cubic centimeter of said alcohol and water combined.

3. The process of claim 2 wherein the alcohol is added in the form of an aqueous solution.

4. The process of claim 3 wherein the alcohol is 2-propanol.

5. The process of claim 2 wherein the alcohol is added in anhydrous form.

6. The process of claim 5 wherein the alcohol is 1-butanol.

References Cited

UNITED STATES PATENTS

| | | | |
|---|---|---|---|
| 2,322,958 | 6/1943 | Tryon | 23—117 |
| 2,377,193 | 5/1945 | Tryon | 23—190X |
| 2,755,171 | 7/1956 | Jones | 23—117 |

E. C. THOMAS, Primary Examiner

U.S. Cl. X.R.

23—190